United States Patent
Li et al.

(10) Patent No.: US 8,840,267 B2
(45) Date of Patent: Sep. 23, 2014

(54) HIGH LUMINANCE MULTICOLOR ILLUMINATION DEVICES AND RELATED METHODS AND PROJECTION SYSTEM USING THE SAME

(75) Inventors: Yi Li, Pleasanton, CA (US); Quan Zhang, Wuhan (CN); Yi Yang, Shenzhen (CN); Fei Hu, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 62 days.

(21) Appl. No.: 13/341,937

(22) Filed: Dec. 31, 2011

(65) Prior Publication Data

US 2013/0100639 A1    Apr. 25, 2013

Related U.S. Application Data

(60) Provisional application No. 61/549,906, filed on Oct. 21, 2011.

(51) Int. Cl.
| | | |
|---|---|---|
| *F21V 9/16* | (2006.01) | |
| *F21V 9/00* | (2006.01) | |
| *G02B 27/14* | (2006.01) | |
| *G03B 21/20* | (2006.01) | |
| *G03B 33/06* | (2006.01) | |

(52) U.S. Cl.
CPC .......... *G03B 21/2013* (2013.01); *G02B 27/149* (2013.01); *G03B 33/06* (2013.01); *G03B 21/204* (2013.01)
USPC ......... 362/231; 362/84; 362/249.02; 362/293

(58) Field of Classification Search
USPC ............................... 362/84, 231, 249.02, 293
See application file for complete search history.

(56) References Cited

U.S. PATENT DOCUMENTS

| | | | | |
|---|---|---|---|---|
| 7,850,335 | B2* | 12/2010 | Hsu et al. | 362/231 |
| 8,403,523 | B2* | 3/2013 | Gerlach et al. | 362/231 |
| 8,556,457 | B2* | 10/2013 | Kiser | 362/231 |
| 2004/0218387 | A1* | 11/2004 | Gerlach | 362/231 |
| 2007/0182887 | A1 | 8/2007 | Haga et al. | |
| 2007/0284994 | A1 | 12/2007 | Morimoto et al. | |
| 2010/0309646 | A1* | 12/2010 | Morikawa et al. | 362/84 |
| 2012/0262914 | A1* | 10/2012 | Block et al. | 362/231 |

FOREIGN PATENT DOCUMENTS

| | | |
|---|---|---|
| CN | 101082401 A | 12/2007 |
| CN | 201599583 U | 10/2010 |

(Continued)

OTHER PUBLICATIONS

Chinese Office Action, dated Sep. 29, 2013, in a counterpart Chinese patent application, No. CN 201110432308.X.

*Primary Examiner* — Peggy Neils
(74) *Attorney, Agent, or Firm* — Chen Yoshimura LLP (57) ABSTRACT

An illumination device and a projection system using the same. The illumination device includes two or more color channels each including one or more light sources for generating a color light. At least one of the color channels includes light sources of a first type for generating a first (narrow band) light and light sources of a second type for generating a second light. The dominant wavelengths of the first and second lights are within 50 nm of each other, and the width of the combined spectrum (sum of normalized spectra of the first and second lights) is greater than the width of the spectrum of the first light by at least 10 nm. A wavelength-based light combiner is used to combine the color lights from the color channels into a combined light.

20 Claims, 11 Drawing Sheets

(56) References Cited

FOREIGN PATENT DOCUMENTS

| | | |
|---|---|---|
| JP | 2007318050 A | 12/2007 |
| WO | 2006019016 | 2/2006 |
| WO | 2008050783 A1 | 5/2008 |
| WO | 2011/011980 A1 | 2/2011 |

* cited by examiner

HIGH LUMINANCE MULTICOLOR ILLUMINATION DEVICES AND RELATED METHODS AND PROJECTION SYSTEM USING THE SAME

This application claims priority under 35 USC §119(e) from U.S. Provisional Patent Application No. 61/549,906, filed Oct. 21, 2011, which is herein incorporated by reference in its entirety.

This application also claims priority from China patent application No. 201110345905.9, filed Nov. 4, 2011, which is herein incorporated by reference in its entirety.

BACKGROUND OF THE INVENTION

1. Field of the Invention

The present invention is in the technical field of illumination devices. More particularly, the present invention is in the technical field of multicolor illumination devices and projection systems using the same.

2. Description of the Related Art

Narrow band light sources, such as laser diodes (LDs) and light emitting diodes (LEDs), emit light with a narrow wavelength-band. Such narrow band lights are typically highly saturated in color, which can produce much more vivid colors than those usually seen in nature. Wide band light sources, such as those employing phosphor materials excited by an excitation light, emit lights with wide wavelength-bands. Such wide band light are typically less saturated in color, which can produce natural and soft color similar to those usually seen in nature. Such wide band light also has higher color rendering index, which is a measure of a light's ability to show natural colors of illuminated objects. The closer a white color is to sun light in its spectrum, the higher its color rendering index. Sun light has a continuous and relatively smooth spectrum which covers the entire visible range.

In some applications, such as stage lighting and decorative lighting, both narrow band light and wide band light are desired. For example, when it is desired to achieve high color contrast and vivid lights, narrow band light sources can be used. When white light is used, it is often desired to employ light with high color rendering index so that the illuminated objects appear to be more natural. Currently, lamps which emit white light are usually used together with color filters to achieve a color light. However, it is very inefficient to generate highly saturated color using lamps that emit white light. Also, such a method can only achieve a limited number of color lights, and it is difficult to achieve a continuous transition from color to color.

Figure 1:
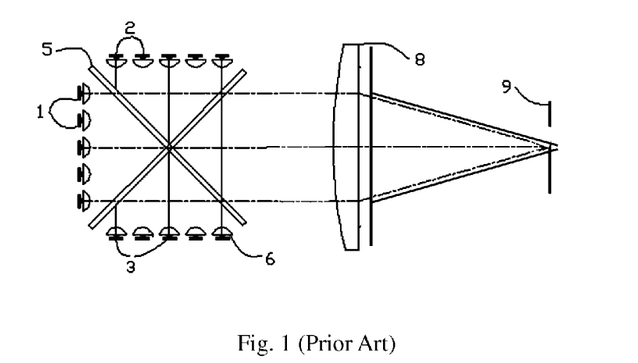
FIG. 1 illustrates a schematic view of a known multicolor illumination device.
Figure 1A:
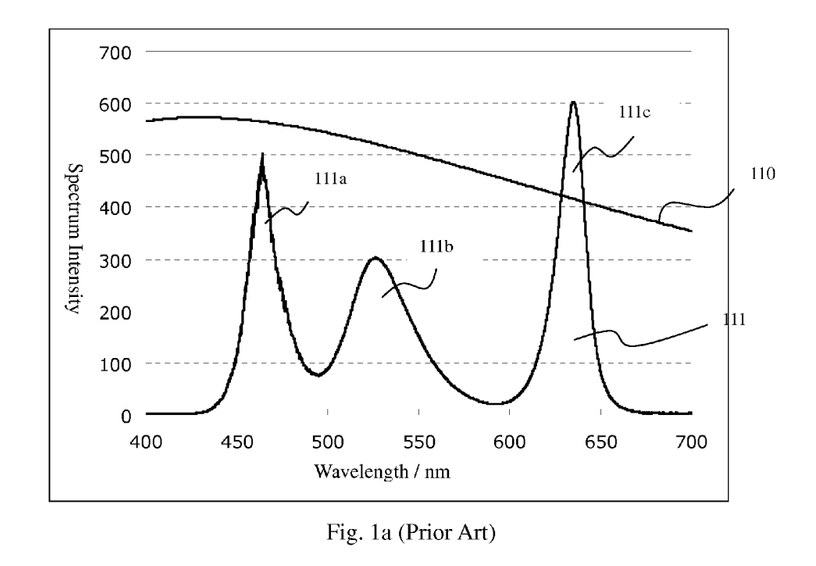
FIG. 1a illustrates a spectrum of the RGB LED mixed light produced by the illumination device of FIG. 1.

So solve the above problems, a known multi-channel illumination device can be provided, as shown in FIG. 1. In the illumination device shown in FIG. 1, lights emitted from a green LED array 1, a red LED array 2 and a blue LED array 3 are collimated by collimators 6, and then combined by an X-shape dichroic filter set 5 into one beam. The combined light is projected by an optical system 8 onto a screen 9. In this device, red, green and blue lights are used as primary lights to produce other colored light or white light. For example, a yellow light can be obtained by a mixture of red light and green light. A white light can be obtained by a mixture of red, blue and green lights, the spectrum 111 of which is shown in FIG. 1a. The white light spectrum 111 contains a blue peak 111a, a green peak 111b and a red peak 111c. By independently controlling the intensities of the three primary colors (R, G, B) lights, it is possible to obtain every color light with chromaticity coordinates located inside the color gamut constructed by the three primary colors (R, G, B) and the illumination efficiency is improved as compared to the use of color filters. However, the mixed color light and mixed white light often look unnatural and their color renderings are often unsatisfactory. The problem comes from the fact that the three highly saturated primary lights have narrow spectra, and the spectrum of the mixed light has peaks and valleys, which is very different from the spectrum of sun light 110. As shown in FIG. 1a, the spectrum of RGB LED mixed white light has two valleys around 480 nm and 590 nm, making it difficult to show cyan and amber colors.

Figure 2:
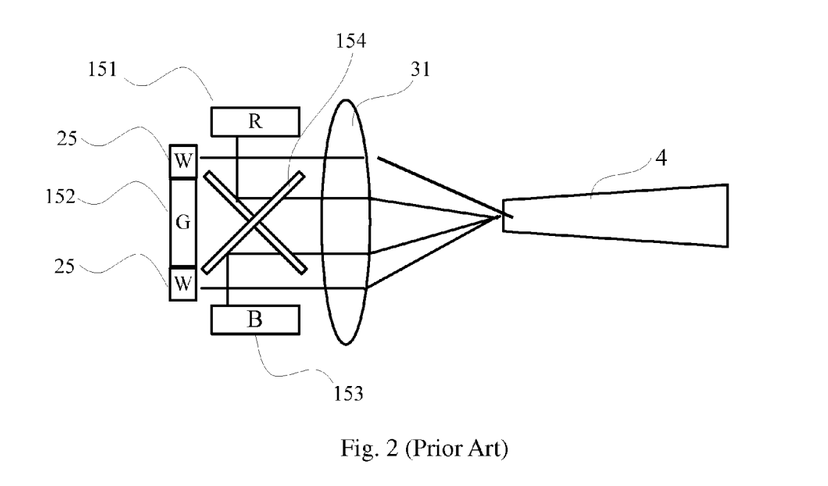
FIG. 2 illustrates a schematic view of another known multicolor illumination device.
Figure 2A:
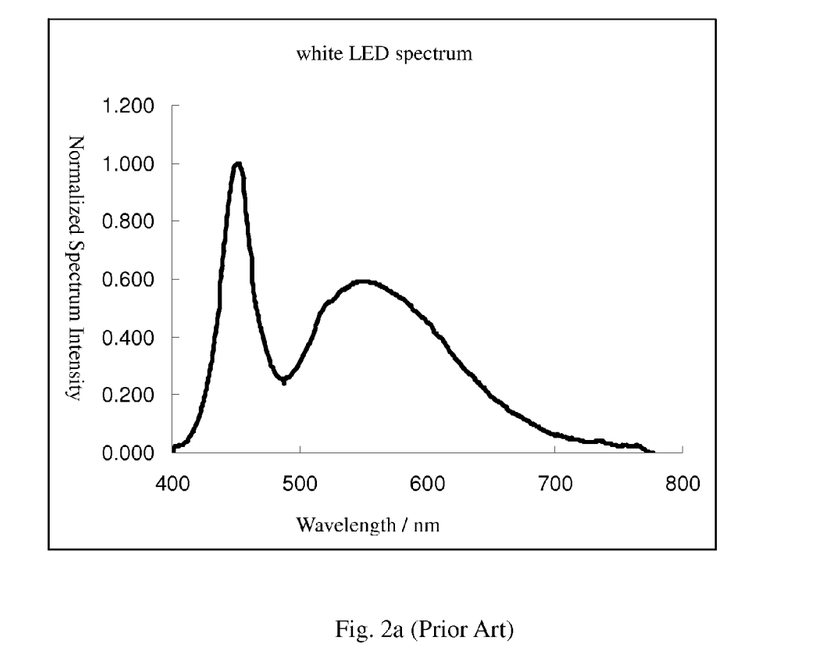
FIG. 2a illustrates a spectrum of a white phosphor LED light used in the illumination device of FIG. 2.

To solve the problem of low color rendering index, FIG. 2 shows the optical structure of another known illumination device, where RGB LEDs 151, 152, 153 are used as primary color light sources, and white light emitted from a set of white LED sources 25 are combined with the primary color light bundle by lens 31 into a light collector 4. The white source 25 is phosphor-converted source (i.e. a source that generates light using phosphor materials excited by an excitation light) and mixes yellow light from the phosphor with unabsorbed blue excitation light to generate a white light, which has a wide wavelength-band as shown in FIG. 2a. The light emitted from this illumination device looks more natural and has a higher color rendering index compared to the spectrum of FIG. 1a because of the addition of wide band white light. However, because of the large spectrum overlap between white light and the RGB primary color lights, the white light cannot be combined with the primary color lights by the dichroic filter set 154 as it would lead to heavy losses, and a light combiner that combines light in the spatial domain (e.g. lens 31) is needed. As a result, the size of the mixed light bundle will increase as compared to the size of the primary light from the RGB LEDs, which will result in an increase of etendue and decrease of brightness of the combined light.

It should be noted that for a low-saturation single color light to look more natural, its spectrum needs to be relatively wide so that it is more comparable to the spectrum of natural light having low color saturation. Then, the low fidelity of a low-saturation light and the low color rendering index of a white light are the same problem at their base, which is the narrow spectrum width of the light. Thus, it should be understood that when the following descriptions refer to the low color rendering index of a white light, it also refers to the low fidelity of a low-saturation light.

As seen from the above discussion, the use of wide band white light in FIG. 2 can solve the problem of low color rendering index, but tends to reduce the brightness of the light source. There is a tradeoff between high color rendering index and high brightness.

SUMMARY OF THE INVENTION

The present invention is directed to an illumination device that substantially obviates one or more of the problems due to limitations and disadvantages of the related art.

An object of the present invention is to provide an illumination device that can generates a light having desired color and color rendering ability.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an illumination device which includes: two or more color channels, each color channel including one or more light sources for generating a color light, wherein for at least one of the two or more color channels, each color channel includes one or more light sources of a first type for generating a first light and one or more light sources of a second type for generating a second light, wherein the first light is a narrow band light, wherein a dominant wavelength of the first light and a dominant wavelength of the second light are within 50 nm of each other, and wherein a width of a combined spectrum that is a sum of normalized spectra of the first and second lights is greater than a width of a normalized spectrum of the first light by at least 10 nm; and a wavelength-based light combiner for combining the color lights from the two or more color channels into a combined light.

In another aspect, the present invention provides a projection system employing the above multicolor illumination device.

In another aspect, the present invention provides a method for generating a colored light, which includes: generating a plurality of color lights, wherein at least one of the plurality of color lights includes a first light and a second light, the first light being a narrow band light, a dominant wavelength of the first light and a dominant wavelength of the second light being within 50 nm of each other, and a width of a combined spectrum that is a sum of normalized spectra of the first and second lights is greater than a width of a normalized spectrum of the first light by at least 10 nm; independently controlling the plurality of color lights, including independently controlling the first and second lights of respective colors; and combining the plurality of color lights into a combined light, the combined light having an etendue approximately equal to an etendue of one of the plurality of color lights.

Advantages of the illumination device according to embodiments of the present invention have the following advantages. By introducing a second type of light sources in addition to a narrow band light source, a highly saturated narrow band light and a less saturated wide band light are simultaneously output, and the spectrum width is broadened. This improves the coloring rendering ability of the illumination device. Meanwhile, by using a wavelength-based light combiner to combine lights from different channels, the size and etendue of the output light is not increased compared to the size and etendue of the individual channels, so that the brightness of the light is maintained.

It is to be understood that both the foregoing general description and the following detailed description are exemplary and explanatory and are intended to provide further explanation of the invention as claimed.

DETAILED DESCRIPTION OF THE PREFERRED EMBODIMENTS

The present invention relates to a method and apparatus for a multicolor illumination device. In one embodiment, the multicolor illumination device includes at least two color channels, each color channel including at least one light source for generating a color light, wherein for at least one of the at least two color channels, the color channel includes at least one light source of a first type for generating a first light and at least one light source of a second type for generating a second light, the first light being a narrow band light. In the same color channel, the first and second lights generated by the first and second types of light sources have the same color, which should be understood in this disclosure to mean that they have similar dominant wavelengths. Under the definition of dominant wavelength, lights with similar dominant wavelengths have similar perceived colors. As used in this disclosure, two lights are considered to have the "same color" if their dominant wavelengths are within 50 nm of each other. In the above illumination device, of the first and second light of the same color, the first one is a narrow band light, such that the combined spectrum that is the sum of the normalized spectra of the first and second light has a spectrum width that is larger than the spectrum width of the first light by at least 10 nm. Using these two types of lights, the spectrum is broadened and the color rendering index of the illumination device is improved.

Moreover, the multiple channels are combined using a wavelength-based light combiner, so that the size and etendue of the combined light are not increased compared to those of each channel, and the brightness of the illumination device is not degraded. When the multiple channels have approximately the same etendue, the etendue of the combined light is approximately the same as that of the individual channels; when the multiple channels have different etendue, the etendue of the combined light is approximately the same as the greatest one of the etendue of the individual channels. This is different from the technology of FIG. 2, where the etendue of the combined light (after lens 31) is greater than the etendue of each of the individual channel.

The multiple channels can be independently controlled to turn on and off and/or to change intensity to generate the mixed light of desired colors. Further, each type of light within a color channel can be independently controlled to turn on/off or change intensity. For each channel, to ensure the combined spectrum has a spectrum width that is larger than the spectrum width of the first light by at least 10 nm, the first light is a narrow band light, and the second light may be a wide band light with a soft, natural color, whose spectrum width is wider than that of the first light by at least 10 nm. Alternatively, the second light may be another narrow band light, i.e., the spectrum width of the second light is not broader than that of the first light by 10 nm or more, but the difference between the peak wavelengths of the first and second lights is more than 10 nm, so that the spectrum width of the combined light is broadened.

As used in this disclosure, the terms "narrow band light" and "wide band light" are relative concepts; in other words, when the spectrum widths of two light are different by more than 10 nm, the narrower band light is referred to as the "narrow band light" and the broader band light is referred to as the "wide band light", and when their spectrum widths are not different by more than 10 nm, both are referred to as "narrow band light". Spectrum widths may be defined in a number of ways, including by FWHM (Full Width Half Maximum), i.e. the spectrum's full width at the spectrum intensity which is half of its maximum intensity. In embodiments of the present invention, the narrow band light may be a light emitted by a LED or LD or other narrow band light source, and wide band light may be excited light (converted light) emitted by a phosphor material, or other wide band light sources. In the following descriptions, LEDs are used as examples of narrow band light sources, but other types of narrow band light sources such as LDs may also be used to implement the invention. Phosphors are used as examples of wide band light sources, but other wavelength conversion materials may be used, such as dyes, quantum dots, etc., and other wide band light sources may be used.

Figure 3:
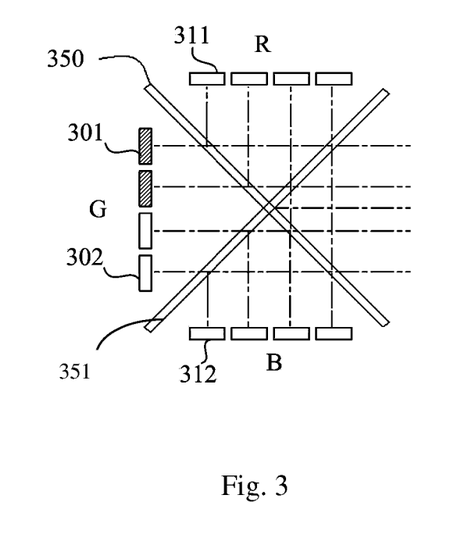
FIG. 3 illustrates a schematic view of an illumination device according to a first embodiment of the present invention.

FIG. 3 illustrates a schematic view of an illumination device according to a first embodiment of the present invention. The illumination device includes red (R), green (G) and blue (B) primary color channels whose light are combined by an X-shaped dichroic filter set including filters 350, 351. In the illustrated embodiment, the dichroic filter 350 reflects red light and transmits green and blue lights, and the dichroic filter 351 reflects blue light and transmits green and red lights. As a result, the combined light containing red, green and blue lights is output to the right of the dichroic filter set 350, 351 in FIG. 3. In this embodiment, the red and blue channels include red LEDs 311 and blue LEDs 312, respectively, emitting narrow band red and blue lights.

In conventional technologies, the green channel only includes green LEDs. To broaden the spectrum of the green channel, in this embodiment, the green channel includes two types of light sources, where the first green light source generates a narrow band green light (first green light) and the second green light source generates a wide band green light (second green light), such that the combined spectrum that is the sum of the normalized spectra of the first and second green lights has a spectrum width that is larger than the spectrum width of the first green light by at least 10 nm. Specifically, the first green light source is green LEDs 302 which do not contain a phosphor, emitting a narrow band green light; the second green light source is green phosphors 301 excited by an excitation light source, emitting a wide band green light.

Figure 4:
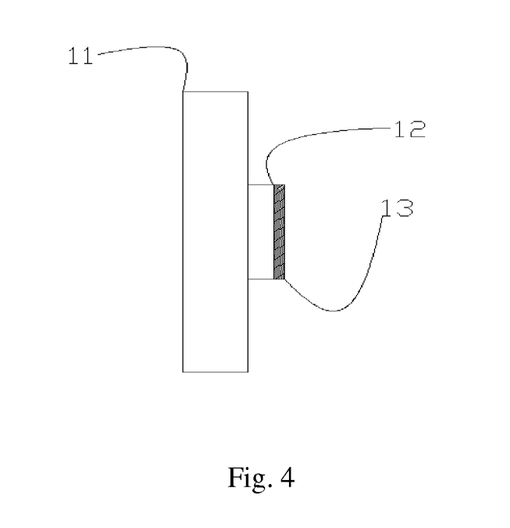
FIG. 4 illustrates a schematic view of a phosphor material on an excitation light source.

FIG. 4 illustrates an example of a light source 11 having a phosphor and an excitation light source. In this example, the phosphor 13 is coated on the LED chip 12 which acts as the excitation light source. The LED 12 can be an ultraviolet (UV) or a blue LED. The phosphor 13 absorbs the light from LED 12 and generates light with a wavelength range different from that of the LED 12 light. Emitted light from phosphors generally has a broad spectrum compared to the light generated by an LED without wavelength conversion. For convenience, in this disclosure, an LED with a phosphor material is referred to in this as "phosphor LED".

Figure 5A:
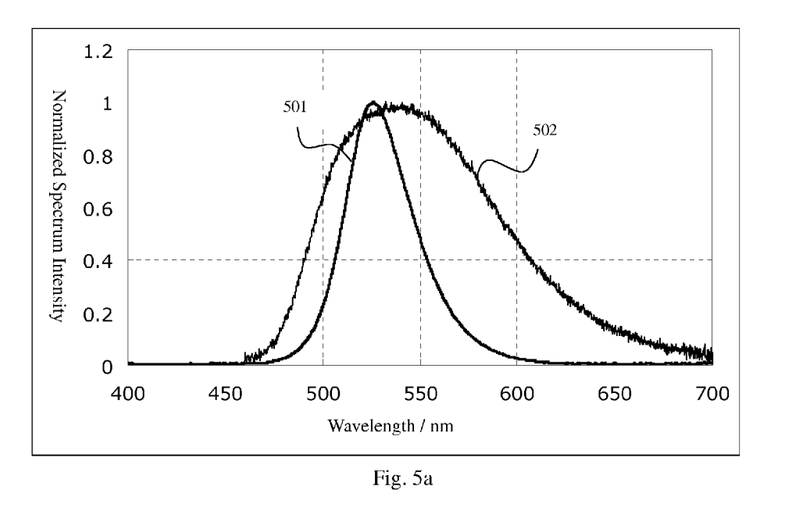
FIG. 5a shows an example of the spectra of a green LED and a green phosphor LED useful in the illumination device of FIG. 3.
Figure 5B:
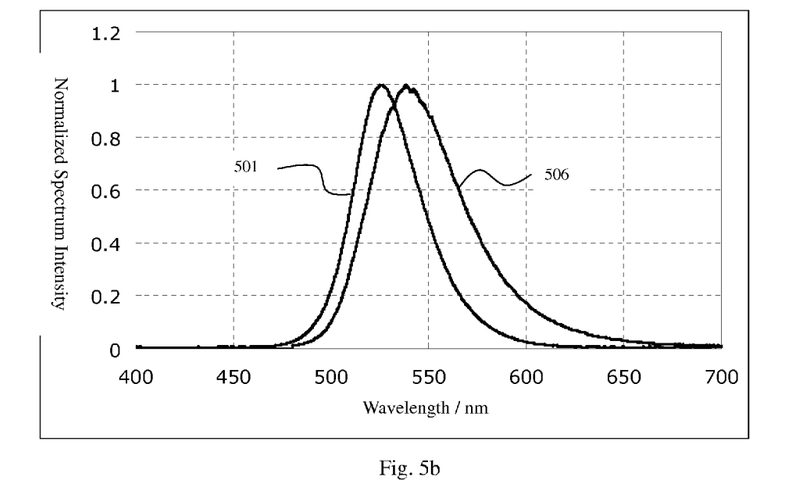
FIG. 5b shows another example of the spectra of a green LED and a green phosphor LED useful in the illumination device of FIG. 4.

FIG. 5a show exemplary spectra of the two green lights of the green channel in the embodiment of FIG. 3. The normalized spectrum of the narrow band light from the green LEDs 302 is shown as curve 501, with a FWHM spectrum width of about 40 nm. This light appears as a vivid green color. The normalized spectrum of the wide band light from the green phosphor LEDs 301 is shown as curve 502, with a FWHM spectrum width of about 105 nm. This light appears as a soft green color. The difference in spectral shape of these two lights leads to different perceptions of the green color. Generally, when two spectra in the green region have an FWHM difference greater than 10 nm, the two lights will have different visual perceptions. FIG. 5b shows the spectrum 506 of another green phosphor, with an FWHM of 54 nm. The spectrum width of this green phosphor light is wider than that of the spectrum 501 by 14 nm. Further, to make the two green lights closer to being perceived as "the same color", preferably, the dominant wavelengths of the two green lights are less than 25 nm apart.

In the embodiment of FIG. 3, two types of light sources are independently controlled by control circuitry (not shown) to turn on and off or change intensity. This may be done, for example, by different drive currents in a continuous driving mode or by different duty cycles in a pulse driving mode or a combination thereof. Therefore, the luminous flux contributions from the two types of green light sources can be adjusted, so that the spectrum, chromaticity coordinates, brightness, and saturation of the resulting combined green light are tunable. When a more vivid green light is desired, the green LEDs 302 can be turned on with the phosphor LEDs 301 turned off. Similarly, when softer green light is desired, the green phosphor LEDs 301 can be turned on while the green LEDs 302 are turned off. Moreover, the two types of light sources can be turned on at the same time to generate a combined green light which has a color saturation between those of the green LEDs and green phosphor LEDs.

Figure 5C:
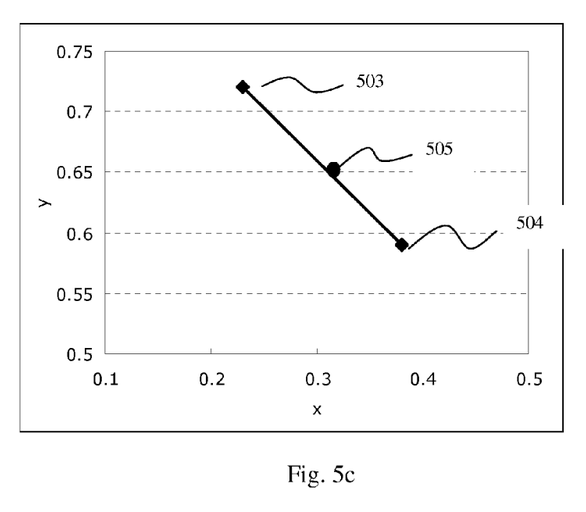
FIG. 5c shows colors of two types of green light sources in the illumination device of FIG. 3 in the International Commission on Illumination (CIE) 1931 color space.

In more detail, FIG. 5c shows exemplary colors of the two types of green light sources of FIG. 3 in an International Commission on Illumination (CIE) 1931 color space. In this example, the green lights from green LEDs 302 and green phosphor LEDs 301 have chromaticity coordinates 503 (0.23, 0.72) and 504 (0.38, 0.59), respectively. The output green light of the green channel is the combination of the two green lights and its chromaticity coordinates 505 fall on the straight line connecting the two points 503 and 504. By controlling the intensities of these two green lights change, the chromaticity coordinates of their combined light 505 shift along the line connecting points 503 and 504 in the color space, to provide controllable chromaticity and color saturation. For example, if a more vivid green light is desired, the intensity of the LEDs 302 may be increased and the intensity of the phosphor LEDs 301 may be decreased or both; if a softer green light is desired, the intensity of the LEDs 302 may be reduced and the intensity of the phosphor LEDs 301 may be increased or both. Further, the number of LEDs 302 and phosphor LEDs 301 in the illumination device may be adjusted depending on the practical application; for example, if the illumination device is for stage lighting, it will tends to require more vivid light, so more LEDs 302 and fewer phosphor LEDs 301 may be provided.

Compared with the conventional technology shown in FIG. 2, in the embodiment of FIG. 3, the green primary light outputted by the green channel has a broader spectrum, so the combined light of the three channels have a higher color rendering index. Meanwhile, by using dichroic filters to combined the three channels, the size and etendue of the combined light are not increased compared to those of each channel (in fact, the etendue of the combined light is similar to that of the individual channels), and the brightness of the illumination device is not degraded.

In this embodiment, by introducing the green phosphor LEDs 301, the light of the green channel has a broadened spectrum, which is wider than the spectrum of the green LED light by more than 10 nm. Further, by independently controlling the two green lights, the output green light of the green channel is adjustable between the vivid narrow band color and the soft wide band color. Alternatively, the wide band output green light can be achieved by using two narrow band green lights, as generally described earlier and as will be illustrated by the example of the second embodiment described below.

Figure 6A:
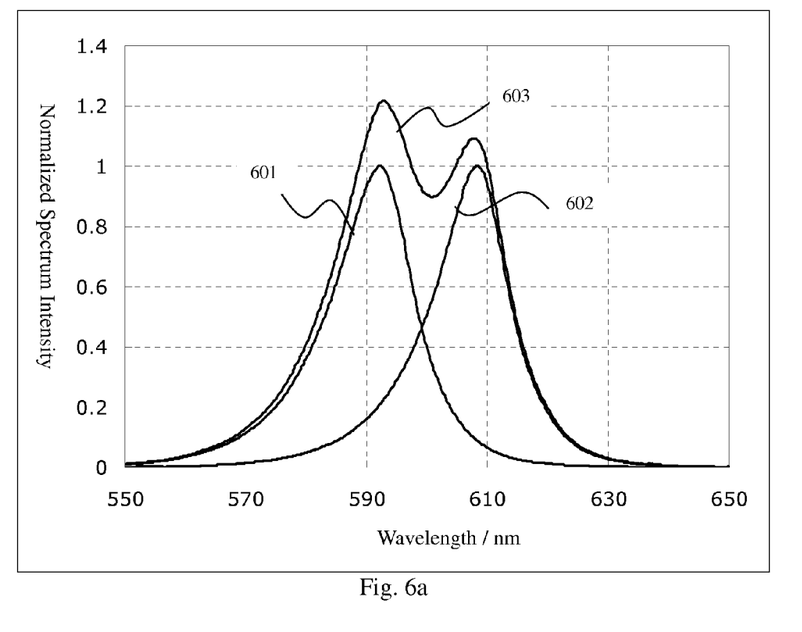
FIG. 6a shows an example of the spectra of two red LE lights used in an illumination device according to a second embodiment of the present invention.

In a second embodiment of the present invention, the illumination device employs two red LEDs as examples of two narrow band light sources. As shown in FIG. 6a, the spectrum of the light generated by the first red LEDs is 601, whose spectrum width FWHM is 15 nm; the spectrum of the light generated by the second red LEDs is 602, whose spectrum width FWHM is also 15 nm, but the peak wavelengths of the two lights 601 and 602 are 16 nm apart from each other. The spectrum 603 is the spectrum of the combined light of 601 and 602, and its FWHM is 31 nm. This demonstrates that the combination of two narrow band lights with different peak wavelengths can be combined to produce a wide band light. The peak wavelength of a spectrum refers to the wavelength at which the spectrum power is the highest. Typically, when the peak wavelengths of two narrow band lights are separated by more than 10 nm, the combined light will have a spectrum width that at least 10 nm wider than the spectrum width of the narrower one of the two lights, resulting in a different visual perception than a narrower band light. Preferably, when both the first and second lights are narrow band lights, and the peak wavelength difference between the two is approximately the same as the average value of the FWHMs of the two lights, the combined light will have a smooth shape with a broad spectrum width. It should be noted that in the context of this disclosure, when the difference in spectrum widths of two lights is less than 10 nm, both lights are considered narrow band lights; in other words, whether each light is considered a narrow band light is determined by the difference in spectrum widths, not the absolute spectrum width of each light. Thus, for example, when the two lights are emitted by two different phosphor LEDs and the difference of their peak wavelengths is less than 10 nm, both phosphor LEDs are considered narrow band lights, and the broadening of the spectrum is achieved by the different peak wavelengths of the two lights.

It should be noted that, in the second embodiment, the spectrum width is measured by the FWHM; when the peak wavelengths of the two lights 601 and 602 are separated by a relatively large distance, it is possible for the combined light spectrum 603 to have a valley between two peaks where the valley is lower than one half of the peak intensity of the combined spectrum. In such a case, the spectrum width of the combined light 603 is defined as the sum of the FWHM of the first spectrum 601 and the FWHM of the second spectrum 602.

To distinguish the first and second embodiments described above, in this disclosure, when a primary channel includes at least two light emitting devices emitting two (first and second) lights and the FWHM of the first light is wider than the FWHM of the second light by at least 10 nm, the first light is referred to as a wide band light and the second light is referred to as a narrow band light. This is the case in the first embodiment (e.g. FIG. 5a and FIG. 5b). When the two FWHMs of the first and second lights are different by less than 10 nm, then both the first and the second lights are referred to as narrow band lights, even if both lights are lights emitted by phosphors or other wide band light sources. If their peak wavelengths are separated by 10 nm or more, the combined light of the two lights is a wide band light. This is the case in the second embodiment (e.g., FIG. 6a).

In the second embodiment, similar to the first embodiment, the two light sources can be independently controlled to turn on or off or change intensity. The color and spectrum of the combined light can be adjusted as a result.

Figure 6B:
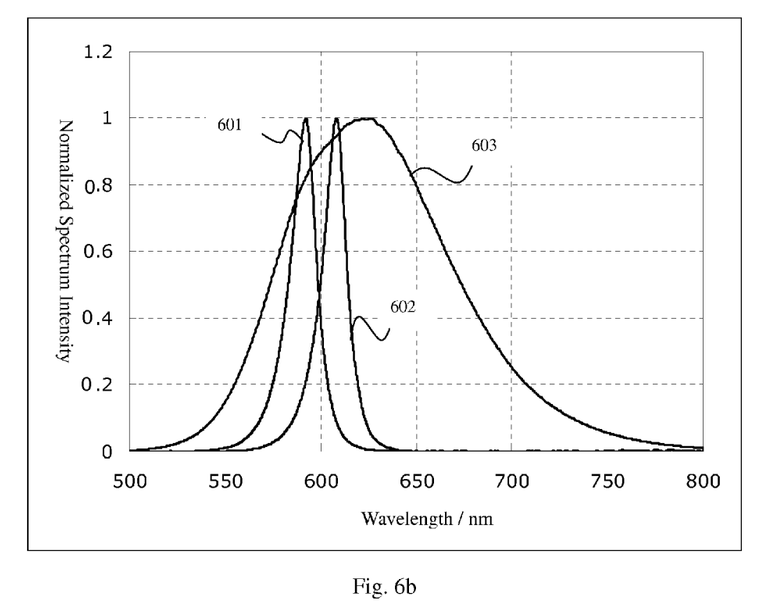
FIG. 6b shows an example of the spectra of three red lights, including the two red LED lights shown in FIG. 6a and a third red light.

In the first and second embodiments described above, each of the primary color channels includes two types of light sources. Alternatively, each channel may include three or more types of light sources. As shown in FIG. 6b, in addition to the first and second lights 601 and 602, a third red light source is added, which is a red phosphor LED having a spectrum 604. The spectrum width of the third light 604 is about 105 nm, much larger than the widths of the first and second lights (15 nm). This can be considered a combination of the first and second embodiments: the lights 601 and 602 are two narrow band lights with peak wavelength separation of more than 10 nm, satisfying the characteristics of the second embodiment; relative to lights 601 and 602, the third light 604 is a wide band light, satisfying the characteristics of the first embodiment.

Figure 7:
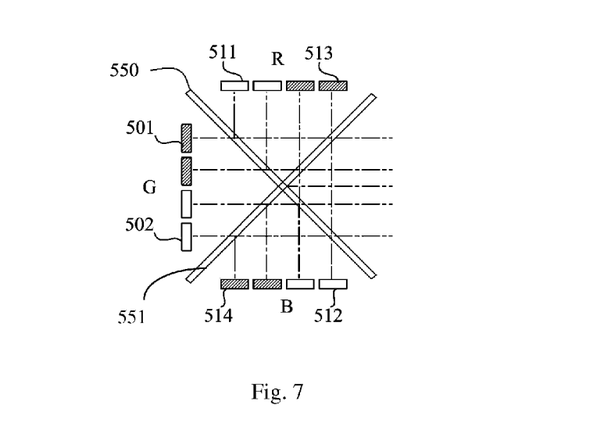
FIG. 7 illustrates a schematic view of an illumination device according to a third embodiment of the present invention.

In the first and second embodiments, one of the primary color channels has two or more types of light sources. In other embodiments of the present invention, two or more primary channels may each have two or more types of light sources. An illumination device according to a third embodiment of the present invention is shown in FIG. 7. In this embodiment, the red channel includes red LEDs 511 and red phosphor LEDs 513, the green channel includes green LEDs 502 and green phosphor LEDs 501, and the blue channel includes blue LEDs 512 and blue phosphor LEDs 514. The light from the three channels are combined by an X-shape dichroic filter set including filters 550 and 551 which may be similar to the dichroic filters 350 and 351 in FIG. 3.

Figure 8:
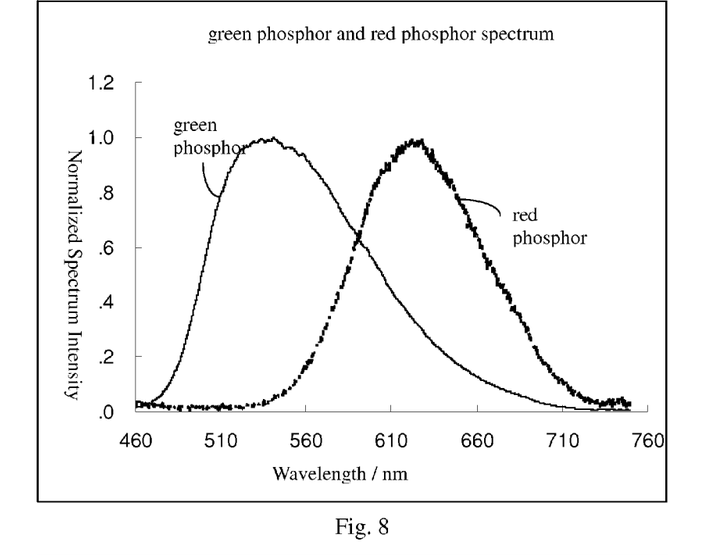
FIG. 8 shows the emission spectra of a green phosphor and a red phosphor used in the illumination device of FIG. 7.
Figure 9:
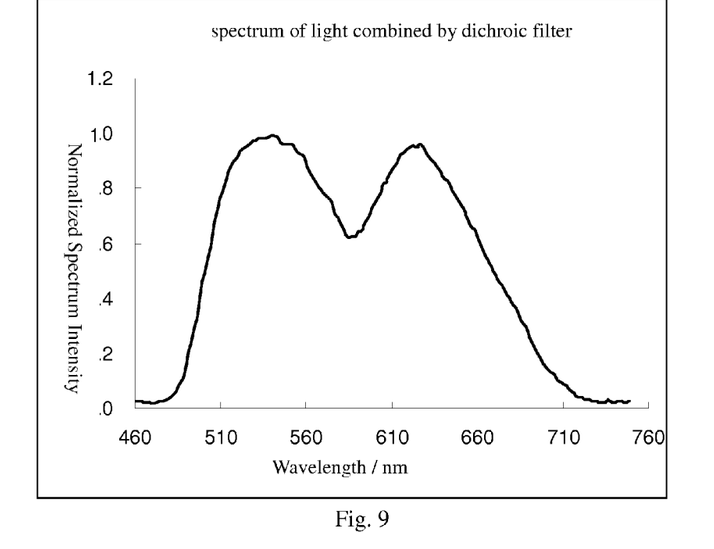
FIG. 9 shows the spectrum of a mixed light from a green phosphor and a red phosphor of FIG. 8 after being combined by a dichroic filter set.

To make the two blue lights in blue channel and two red lights in red channel respectively closer to being perceived as "the same color", preferably, the dominant wavelengths of the two red lights are less than 35 nm apart, the dominant wavelengths of the two blue lights are less than 15 nm apart. The generation of wide band yellow light is used as an example below to explain how wide band combined light is generated in the illumination device of the third embodiment. A wide band yellow light is formed by combining a wide band red light and a wide band green light. Thus, the red phosphor LEDs 513 and the green phosphor LEDs 514 are turned on, while other light sources are turned off. The emission spectra of the red phosphor LEDs 513 and green phosphor LEDs 514 are shown in FIG. 8. After passing through the dichroic filter set 550/551, both spectra experience certain loss. This is because the two spectra shown in FIG. 8 have a range of overlap, which leads to losses in the combining process using a dichroic filter set. More specifically, the long wavelength side of the green spectrum is weakened, and the short wavelength side of the red spectrum is weakened. The combined light output from the dichroic filter set is shown in FIG. 9. It can be seen that this spectrum is quite broad; compared to the spectrum shown in FIG. 1a which is formed by combining saturated lights, the unsaturated yellow light spectrum in FIG. 9 is more continuous and the light appears to be more natural and softer.

In the third embodiment, the red channel and the green channel employ wide band light sources 513 and 514, respectively. Because the spectral ranges of the two wide band lights are sufficiently separated, they can be combined into one light beam using a dichroic filter or filter set, and the combined light remains a wide band light. Contrary to the conventional technology shown in FIG. 2, the present embodiment maintains the sizes of the light beam and therefore the brightness of the light sources.

In the above embodiments, the two dichroic filters in the X-shaped filter set are preferably perpendicular to each other. Such a light combiner has a compact shape. Those skilled in the art will appreciate that besides X-shaped dichroic filter sets, other color combiners can be used to combine the red, green and blue lights without increasing the beam size. Examples of such color combiners include an X cube color combiner, parallel placed dichroic color filters, dichroic filters configured in other arrangements, etc. Any wavelength-based light combiner which does not increase the size of the beam may be used.

In the third embodiment shown in FIG. 7, each of the three primary color channels includes two types of light sources. For each channel, the two types of light sources may be according to the principle of the first embodiment (a narrow band light and a wide band light), or according to the principle of the second embodiment (two narrow band lights).

Figure 10:
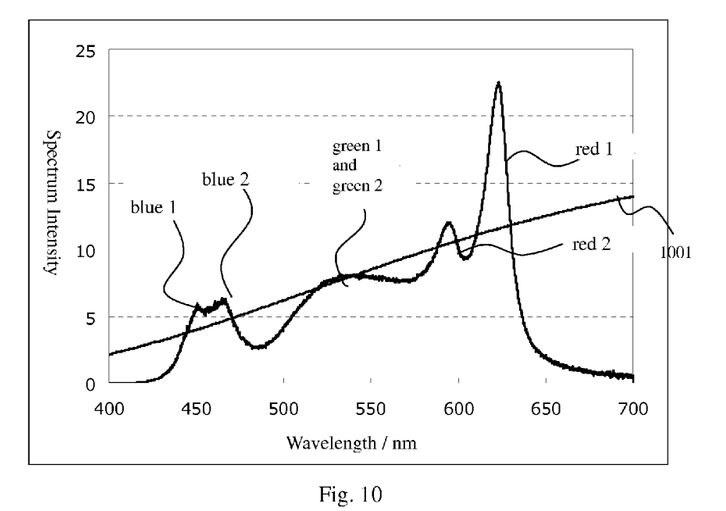
FIG. 10 illustrates an exemplary spectrum of a white light generated by an illumination device according to the second or third embodiment of the present invention.

The illumination device shown in FIG. 7 can produce white light with high color rendering index, as shown in FIG. 10. This exemplary spectrum includes contributions from multiple types of light sources, as indicated by spectral peaks labeled red 1, red 2, blue 1, blue 2, and green 1 and green 2 (mixed). Red 1 and red 2 are narrow band lights which form a wide band red light according to the principle of the second embodiment; blue 1 and blue 2 are narrow band lights which form a wide band blue light according to the principle of the second embodiment; and green 1 and green 2 are narrow and wide band lights, respectively, which form a wide band green light (the two peaks are not distinguishable) according to the principle of the first embodiment. The intensities of these six lights can be independently controlled to adjust the shape of the white spectrum. Compared with the spectrum in FIG. 1a or FIG. 2a, this spectrum of FIG. 10 has much shallower valleys and is perceptually more similar to sun light (spectrum 1001). That is because in each of the three channels, the two or more types of lights are combined to form a spectrum broader than the narrow band spectrum in FIG. 1a. The white light generated this way has a spectrum with a relatively smooth shape which covers the entire visible spectral range. The color rendering index of this light is about 92, much higher than that of the spectrum shown in FIG. 2a, which is 76.

Figure 11:
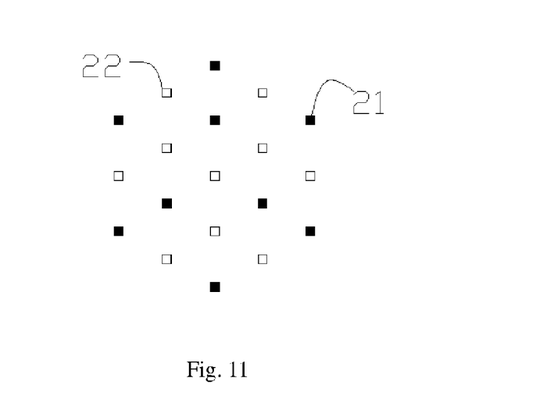
FIG. 11 illustrates a schematic view of an example of spatial arrangement of light sources for a color channel in an illumination device according to an embodiment of the present invention.

In each of the three channels, various spatial arrangement patterns of the two types of light sources may be employed. For example, in one implementation, the two types of light sources can be arranged as shown in FIG. 11, where light sources of different types 21, 22 are arranged in a distributed or dispersed manner such that each light source of one type has light sources of the other type as neighbors. In this way, a substantially spatially uniform output light can be obtained.

The choice of spatial arrangement may be influenced by other factors such as spectral overlap. Because spectra of different colored phosphor LEDs are quite broad, they may have overlaps. For example, the green phosphor LED's spectrum can have overlap with the spectra of the red phosphor LED, as seen in FIG. 8. These spectrum overlaps can lead to energy loss when light from different channels are combined in the wavelength domain by using dichroic filters. The problem caused by spectral overlap may be reduced by arranging the two types of light sources in each channel in a spatially concentrated manner.

Figure 12:
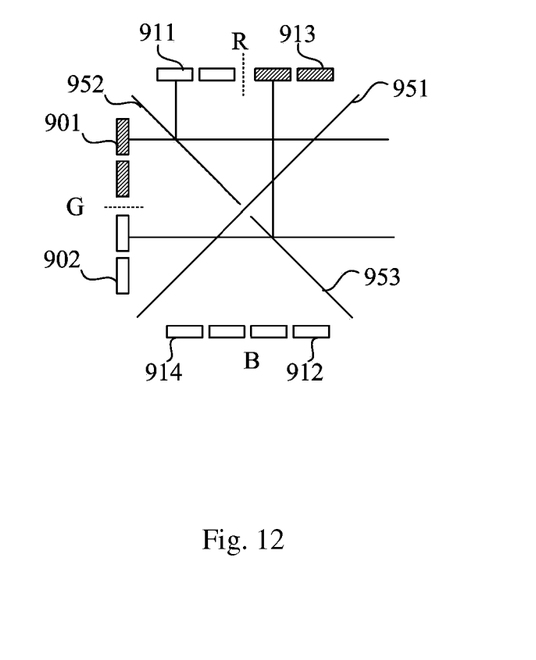
FIG. 12 illustrates a schematic view of an illumination device according to a fourth embodiment of the present invention.

A fourth embodiment of the present invention, shown in FIG. 12, provides an illumination device which employs a concentrated spatial arrangement of different light sources. In the illumination device shown in FIG. 12, the blue channel includes one type (or two types) of light source, e.g. blue LEDs 912 (or 912 and 914), while the red and green channels each include two types of light sources, i.e., green LEDs 902 and green phosphor LEDs 901 and red LEDs 911 and red phosphor LEDs 913. For each of the red and green channels, the two types of light sources are arranged in a concentrated spatial pattern shown in FIG. 13, with each of the two type of light sources 911/902 and 913/901 located on one side of an imaginary line (the dashed line in the figure). The light from the red LEDs 911 and the light from the green phosphor LEDs 901 are combined by a dichroic filter 952 which is disposed on the path of these two lights, and the light from the red phosphor LEDs 913 and the light from the green LEDs 902 are combined by a dichroic filter 953 which is disposed on the path of these two lights. In the illustrated embodiment, the dichroic filters 952 and 953 are disposed on the same plane and form an X-shaped filter set along with a third dichroic filter 951.

Figure 14:
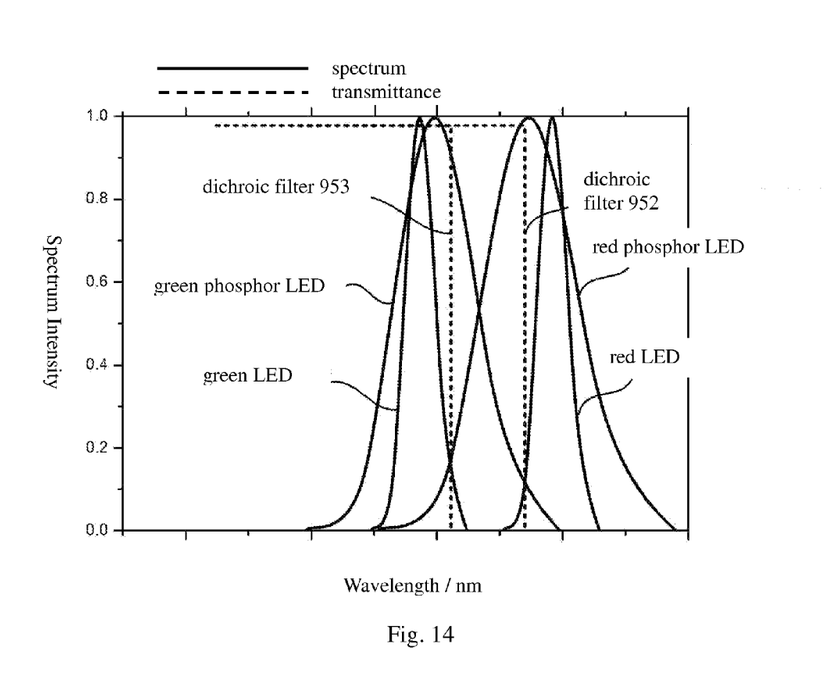
FIG. 14 illustrates the spectra of two lights in the green channel and two lights in the red channels and the transmittance characteristics of the dichroic filters in the illumination device of FIG. 12.

The spectra of light sources in green and red channels and the transmittance characteristics of dichroic filters 952 and 953 are illustrated in FIG. 14. As seen in FIG. 14, although the spectra of red phosphor LEDs and green phosphor LEDs have a relatively large overlap, the spectra of red phosphor LEDs and green LEDs, and the spectra of red LEDs and green phosphor LEDs may have relatively small overlap. The dichroic filters 952 and 953 have different transmittance characteristics, and each of them is used to combine a wide band light and a narrow band light which have a relatively smaller overlap. The dichroic filter 952 transmits light from the green phosphor LEDs 901 and reflects light from the red LEDs 911; the dichroic filter 953 transmits light from the green LEDs 902 and reflects light from the red phosphor LEDs 913. Because there is no need to combine the red phosphor LED and green phosphor LED spectra which have a large overlap, there is relatively less energy loss when combining the red and green channels, which increases energy efficiency.

Moreover, even when the red channel has only red LEDs 911 and no red phosphor LEDs 913, the principle described above still applies. This is because while the spectrum of red LED light does not substantially overlap with that of the green LED light, it overlaps with the spectrum of the green phosphor LED light. Thus, the two dichroic filters 952 and 953 with different transmission characteristics will help reduce loss. Specifically, the dichroic filter 952 is used to combine the lights from the red LEDs and green phosphor LEDs, and its transmission curve preferably has its dropping edge located near the intersection point of the two emission spectra for best efficiency. The dichroic filter 953 is used to combine the lights from the red LEDs and green LEDs, and its transmission curve preferably has its edge located between the two emission spectra. The edge of the transmission curve to the dichroic filter 952 is within the range of the red LED, but the edge of the transmission curve to the dichroic filter 953 is not. Thus, in this situation, the two dichroic filters 952 and 953 having different transmission characteristics will lead to an overall reduction of loss.

In the embodiment of FIG. 12, the dichroic filter 951 combines light from the green and blue channels. As these two channel's spectra have relatively small overlap, a single dichroic filter 951 can provide good performance. The LEDs used in the blue channel may be blue LEDs, or royal blue LEDs, or cyan LEDs, or various combinations of two or three of them.

Figure 15:
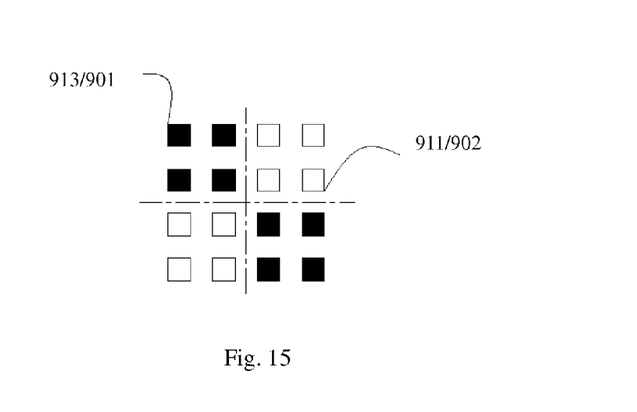
FIG. 15 illustrates a schematic view of another example of spatial arrangement of light sources for a color channel in the illumination device of an embodiment of the present invention.

FIG. 15 shows a spatial arrangement of the two types of light sources according to an alternative implementation of the fourth embodiment. For each of the red and green channels, the light sources are arranged such that each of the two types of light sources 911/902 and 913/901 is located in two diagonal quadrants. Correspondingly, the dichroic filters used to combine the red and green channels are arranged in four quadrants, two diagonal quadrant having transmittance characteristics similar to dichroic filter 952 and the other two diagonal quadrant having transmittance characteristics similar to dichroic filter 953. The quadrants of the red and green channels and the quadrants of the dichroic filters are arranged spatially so that appropriate combination of lights is accomplished according to similar principles described above in connection with FIGS. 12-14. Compared to the arrangement shown in FIG. 13, the arrangement shown in FIG. 15 offers a more uniform output light while providing low loss.

Figure 13:
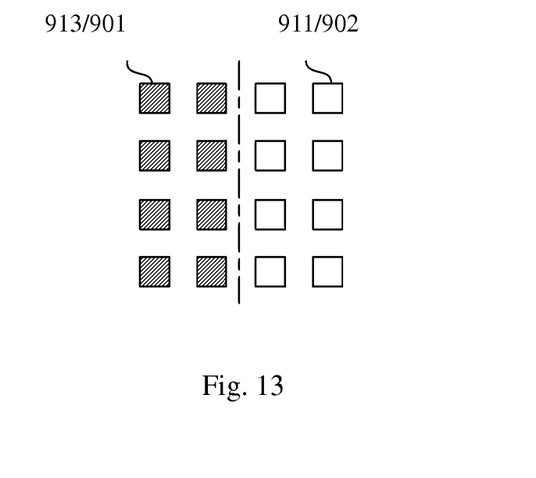
FIG. 13 illustrates a schematic view of another example of spatial arrangement of light sources for a color channel in an illumination device according to an embodiment of the present invention.

It should be noted that while the spatial arrangements illustrated in of FIGS. 13 and 15 each include equal or similar numbers of the two types of light sources, the numbers of the two types of light sources in any given channel can be unequal, and the numbers of each types of light sources of each channel may be dependent on the light emitting efficiency of the particular LEDs or phosphors and/or the intended use of the illumination device.

The illumination devices according to embodiments of the present invention can be used in a projection system. The projection system includes an illumination device according to an embodiment of the present invention, an imager such as a modulator, necessary optical components, and a control system.

Figure 16:
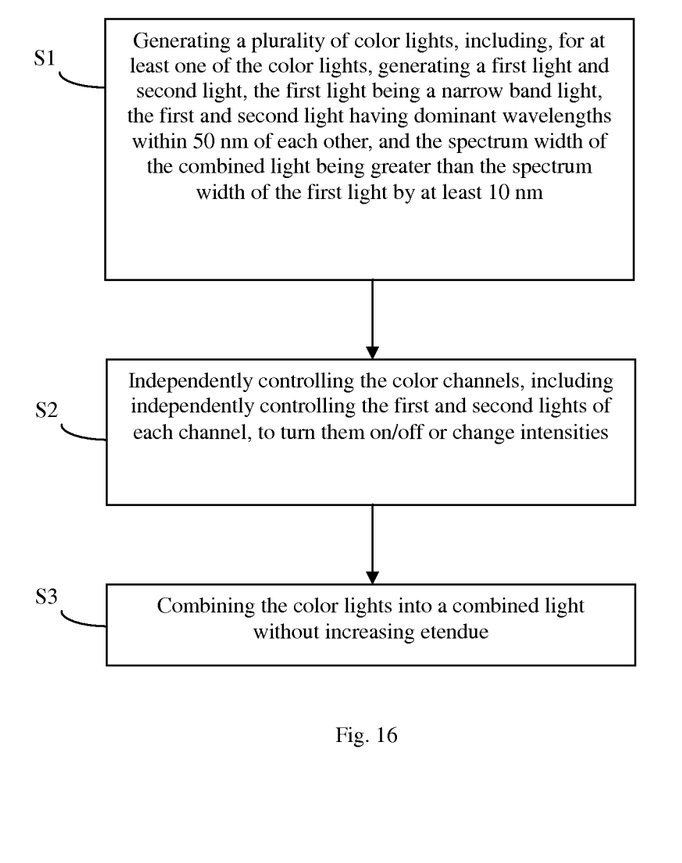
FIG. 16 schematically illustrates a method of generating a colored light using an illumination device according to another embodiment of the present invention.

A method for generating a colored light using the illumination device shown in FIG. 3, 7 or 12 is described below with reference to FIG. 16. The method includes generating a plurality of primary color lights, including, for at least one of the color lights, generating a first (narrow band) light and a second light of the same color (step S1). The meaning of "the same color" is as discussed earlier in this disclosure. The method also includes independently controlling the plurality of color lights, including independently controlling the first and second lights of the same colors (step S2), and combining the color lights into a combined light without increasing etendue (step S3). In particular, the controlling step includes turning on and off and changing intensity of each light being controlled. The method may be performed using the illumination devices according to the various embodiments of the present invention described above.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. An illumination device comprising:
two or more color channels, each color channel including one or more light sources for generating a color light, wherein for at least one of the two or more color channels, each color channel includes one or more light sources of a first type for generating a first light and one or more light sources of a second type for generating a second light, wherein the first light is a narrow band light, wherein a dominant wavelength of the first light and a dominant wavelength of the second light are within 50 nm of each other, and wherein a width of a normalized spectrum of the second light is greater than 50 nm and is greater than a width of a normalized spectrum of the first light by at least 10 nm; and
a wavelength-based light combiner for combining the color lights from the two or more color channels into a combined light.

2. The illumination device of claim 1, wherein the light sources of the first type comprise light emitting diodes (LEDs) and/or laser diodes (LDs) emitting the first light, and the light sources of the second type comprise a wavelength conversion material which converts an excitation light to the second light.

3. The illumination device of claim 1, wherein the two or more color channels includes a green channel generating a green light, the green channel including one or more green light sources of a first type for generating a first green light and one or more green light sources of a second type for generating a second green light.

4. The illumination device of claim 3, wherein the two or more color channels further includes a red channel generating a red light, the red channel including one or more red light sources of a first type for generating a first red light and one or more red light sources of a second type for generating a second red light.

5. The illumination device of claim 4, wherein the green and red light sources of the first type comprise light emitting diodes (LEDs) and/or laser diodes (LDs) emitting the first green and red lights, respectively, and the green and red light sources of the second type comprise wavelength conversion materials which converts excitation lights to the second red and green lights, respectively.

6. The illumination device of claim 5,
wherein the plurality of green light sources of the first type are located in a first area and the plurality of green light sources of the second type are located in a second area,
wherein the plurality of red light sources of the first type are located in a third area and the plurality of red light sources of the second type are located in a fourth area,
wherein the wavelength-based light combiner includes a first dichroic filter for combining light generated by the green light sources of the first type and light generated by the red light sources of the second type, and a second dichroic filter for combining light generated by the green light sources of the second type and light generated by the red light sources of the first type.

7. The illumination device of claim 3, wherein dominant wavelengths of the first and second green lights are within 25 nm of each other.

8. The illumination device of claim 1, wherein the two or more color channels includes a red channel generating a red light, the red channel including one or more red light sources of a first type for generating a first red light and one or more red light sources of a second type for generating a second red light.

9. The illumination device of claim 8, wherein dominant wavelengths of the first and second red lights are within 35 nm of each other.

10. The illumination device of claim 1, wherein the two or more color channels includes a blue channel generating a blue light, the blue channel including one or more blue light sources of a first type for generating a first blue light and one or more blue light sources of a second type for generating a second blue light.

11. The illumination device of claim 10, wherein dominant wavelengths of the first and second blue lights are within 15 nm of each other.

12. The multicolor illumination device of claim 1, wherein at least one of the two or more color channels includes a plurality of light sources of the first type and a plurality of light sources of the second type arranged in a dispersed spatial arrangement relative to each other.

13. An illumination device comprising:
two or more color channels, each color channel including one or more light sources for generating a color light,
wherein for at least one of the two or more color channels, each color channel includes one or more light sources of a first type for generating a first light and one or more light sources of a second type for generating a second light, wherein the first light is a narrow band light, wherein a dominant wavelength of the first light and a dominant wavelength of the second light are within 50 nm of each other, and wherein a width of a combined spectrum that is a sum of normalized spectra of the first and second lights is greater than a width of a normalized spectrum of the first light by at least 10 nm; and
a wavelength-based light combiner for combining the color lights from the two or more color channels into a combined light,
wherein a first one of the two or more color channels includes a plurality of first color light sources of the first type located in a first area and a plurality of first color light sources of the second type located in a second area,
wherein a second one of the two or more color channels includes a plurality of second color light sources of the first type located in a third area and a plurality of second color light sources of the second type located in a fourth area,
wherein the light combiner includes a first dichroic filter for combining light generated by the first color light sources of the first type and light generated by the second color light sources of the second type, and a second dichroic filter for combining light generated by the first color light sources of the second type and light generated by the second color light sources of the first type.

14. The illumination device of claim 1, wherein the two or more color channels includes first, second and third channels, and wherein the wavelength-based light combiner includes a dichroic filter set.

15. The illumination device of claim 14, wherein the dichroic filter set includes a first and a second dichroic filter forming an X-shape, wherein the first dichroic filter reflects light from the first channel and transmits lights from the second and third channels, and the second dichroic filter reflects the light from the third channel and transmits the lights from the second and first channels.

16. The illumination device of claim 1, wherein the plurality of color channels are independently controllable to turn on and off or to change intensity.

17. The illumination device of claim 1, wherein the light sources of the first type and the light sources of the second type of each channel are independently controllable to turn on and off or to change intensity.

18. A projection system comprising the illumination device of claim 1.

19. A method for generating a colored light, comprising:
generating a plurality of color lights, wherein at least one of the plurality of color lights includes a first light and a second light, the first light being a narrow band light, a dominant wavelength of the first light and a dominant wavelength of the second light being within 50 nm of each other, and a width of a normalized spectrum of the second light is greater than 50 nm and is greater than a width of a normalized spectrum of the first light by at least 10 nm;
independently controlling the plurality of color lights, including independently controlling the first and second lights of respective colors; and
combining the plurality of color lights into a combined light, the combined light having an etendue approximately equal to an etendue of one of the plurality of color lights.

20. The method of claim 19, wherein the generating step includes generating the first light using light emitting diodes (LEDs) and/or laser diodes (LDs), and generating the second light using a wavelength conversion material which converts an excitation light to the second light.

* * * * *